(12) United States Patent
Li et al.

(10) Patent No.: US 11,157,045 B2
(45) Date of Patent: Oct. 26, 2021

(54) TERMINAL WITH FLEXIBLE SCREEN

(71) Applicant: BEIJING XIAOMI MOBILE SOFTWARE CO., LTD., Beijing (CN)

(72) Inventors: Peng Li, Beijing (CN); Gaocai Han, Beijing (CN)

(73) Assignee: Beijing Xiamoi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/669,891

(22) Filed: Oct. 31, 2019

(65) Prior Publication Data

US 2020/0341514 A1 Oct. 29, 2020

(30) Foreign Application Priority Data

Apr. 25, 2019 (CN) .......................... 201910340380.6

(51) Int. Cl.
*G06F 1/16* (2006.01)
*G06F 3/14* (2006.01)
*G09G 5/00* (2006.01)
*H04M 1/02* (2006.01)

(52) U.S. Cl.
CPC .......... *G06F 1/1647* (2013.01); *G06F 1/1652* (2013.01); *G06F 1/1656* (2013.01); *G06F 3/1423* (2013.01); *G09G 5/003* (2013.01); *H04M 1/0268* (2013.01); *G09G 2380/02* (2013.01); *H04M 2250/16* (2013.01)

(58) Field of Classification Search
CPC combination set(s) only.
See application file for complete search history.

(56) References Cited

U.S. PATENT DOCUMENTS

| 2009/0051830 A1* | 2/2009 | Matsushita | G06F 1/1647 |
| | | | 348/836 |
| 2009/0237872 A1* | 9/2009 | Bemelmans | G06F 1/1615 |
| | | | 361/679.01 |
| 2010/0167791 A1 | 7/2010 | Lim | |
| 2012/0314400 A1* | 12/2012 | Bohn | G06F 1/1652 |
| | | | 362/97.1 |
| 2016/0147261 A1 | 5/2016 | Bohn et al. | |
| 2016/0216737 A1* | 7/2016 | Hayk | G06F 1/1626 |
| 2016/0266611 A1 | 9/2016 | Wang et al. | |

(Continued)

FOREIGN PATENT DOCUMENTS

| CN | 104933964 A | 9/2015 |
| CN | 108334163 A | 7/2018 |

OTHER PUBLICATIONS

Extended European Search Report of counterpart EP Application No. 19209144.5 dated Apr. 23, 2020, (9p).

(Continued)

*Primary Examiner* — William Boddie
*Assistant Examiner* — Alecia D English
(74) *Attorney, Agent, or Firm* — Arch & Lake LLP

(57) ABSTRACT

A terminal is provided with a flexible screen. The terminal includes a first display screen, a second display screen and a screen spreading and housing device. The first display screen and the screen spreading and housing device are respectively disposed on a front side and a back side of the terminal. The second display screen is the flexible screen. The screen spreading and housing device has different structural forms respectively configured to house and spread the second display screen.

18 Claims, 12 Drawing Sheets

(56) References Cited

U.S. PATENT DOCUMENTS

2017/0364119 A1* 12/2017 Lee .................. G06F 1/1652
2018/0081473 A1* 3/2018 Seo .................. H05K 5/0017
2019/0141849 A1* 5/2019 Xu .................... F16H 21/44

OTHER PUBLICATIONS

First office action of Chinese application No. 201910340380.6 dated Apr. 27, 2021.

* cited by examiner

TERMINAL WITH FLEXIBLE SCREEN

CROSS-REFERENCE TO RELATED APPLICATION

This application claims the benefit of priority to Chinese Application No. 201910340380.6, filed on Apr. 25, 2019, the contents of all of which are incorporated by reference herein.

TECHNICAL FIELD

The present disclosure relates to the field of terminal technologies and in particular to a terminal with a flexible screen.

BACKGROUND

With the development of science and technology, people use more and more types of terminals in their daily life. All these terminals have different appearances and shapes.

In the related art, a terminal (for example, a mobile phone) is generally in the form of a candy bar, a flip type, a folding type, etc. People can use a mobile phone for communication, entertainment, work, etc. For example, they use the terminal to read e-Books, to edit documents, etc.

SUMMARY

In order to solve the problems in the background, the embodiments of the present disclosure provide a terminal with a flexible screen. The technical solutions are as follows.

According a first aspect of the present disclosure, there is provided a terminal with a flexible screen, comprising a first display screen, a second display screen and a screen spreading and housing device. The first display screen and the second display screen are respectively disposed on a front side and a back side of the terminal. The second display screen is a flexible screen. The screen spreading and housing device is configured to house or spread the second display screen through a change of a structural form.

It is to be understood that both the foregoing general description and the following detailed description are exemplary and illustrative only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of devices and methods consistent with aspects related to the disclosure as recited in the appended claims.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

The solutions provided by the present disclosure can be used in a scenario in which a user uses a terminal in daily life. For ease of understanding, some terms and application scenarios involved in the embodiments of the present disclosure will be briefly introduced below.

A flexible screen refers to a flexible OLED (Organic Light-Emitting Diode) screen.

Figure 1:
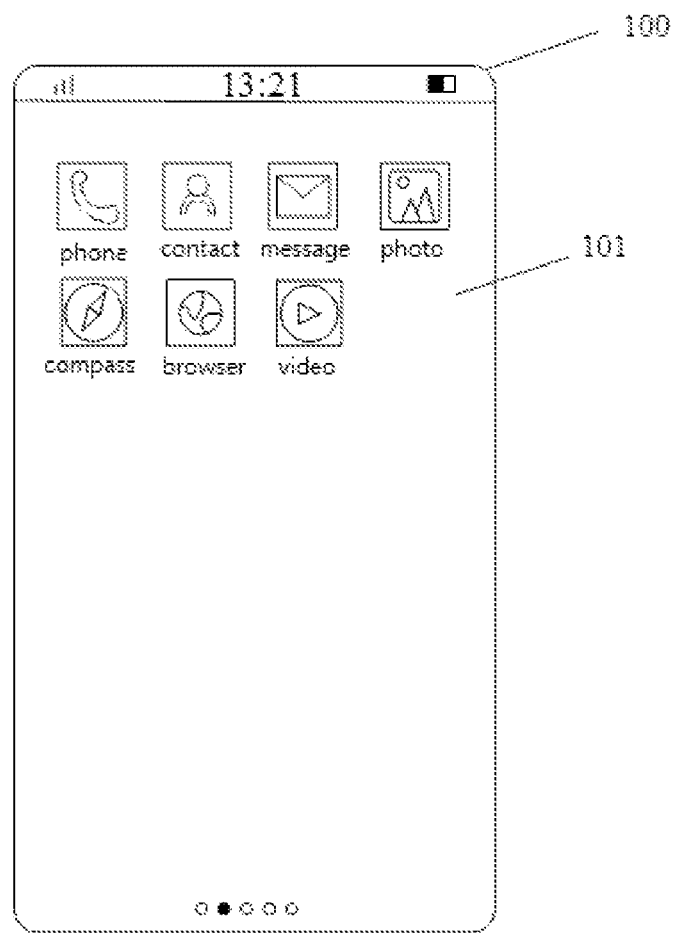
FIG. 1 is a schematic structural diagram of a terminal according to an exemplary embodiment of the present disclosure.

FIG. 1 is a schematic structural diagram of a terminal according to embodiments of the present disclosure. As shown in FIG. 1, the terminal 100 includes a display screen

101. Optionally, the display screen 101 is a touch screen. A user can touch an application icon displayed in the display screen 101 to enable the terminal 100 to display a corresponding interface. For example, the terminal 100 can display a short message (SMS) interface in the display screen 101 when the user clicks an SMS icon in the display screen 101, and the terminal 100 can display a video interface in the display screen 101 when the user clicks a video icon in the display screen 101, etc.

In the related art, different applications may have different requirements on the display screen. For example, the display screen of the terminal can meet the demands of the SMS interface when the terminal displays the SMS interface in the display screen; and although the terminal can play videos in the display screen when the terminal displays the video interface in the display screen, if the attributes of the display screen of the terminal fail to meet the demand for video display, the video interface may be relatively blurrier. However, if the size of the display screen 101 is directly enlarged, on the one hand, a larger-sized screen means higher power consumption, which has a certain influence on the battery durance of the terminal 100; and on the other hand, the size of the terminal 100 needs to be enlarged accordingly when the size of the display screen 101 is enlarged, and as a result, the portability of the terminal 100 will be adversely affected.

Optionally, the terminal described above may be a terminal with a display screen, such as a smart phone, a tablet PC, an e-book reader, smart glasses, a smart watch, a moving picture experts group audio layer IV (MP4) player, a notebook computer, a laptop or a desk computer.

Figure 2:
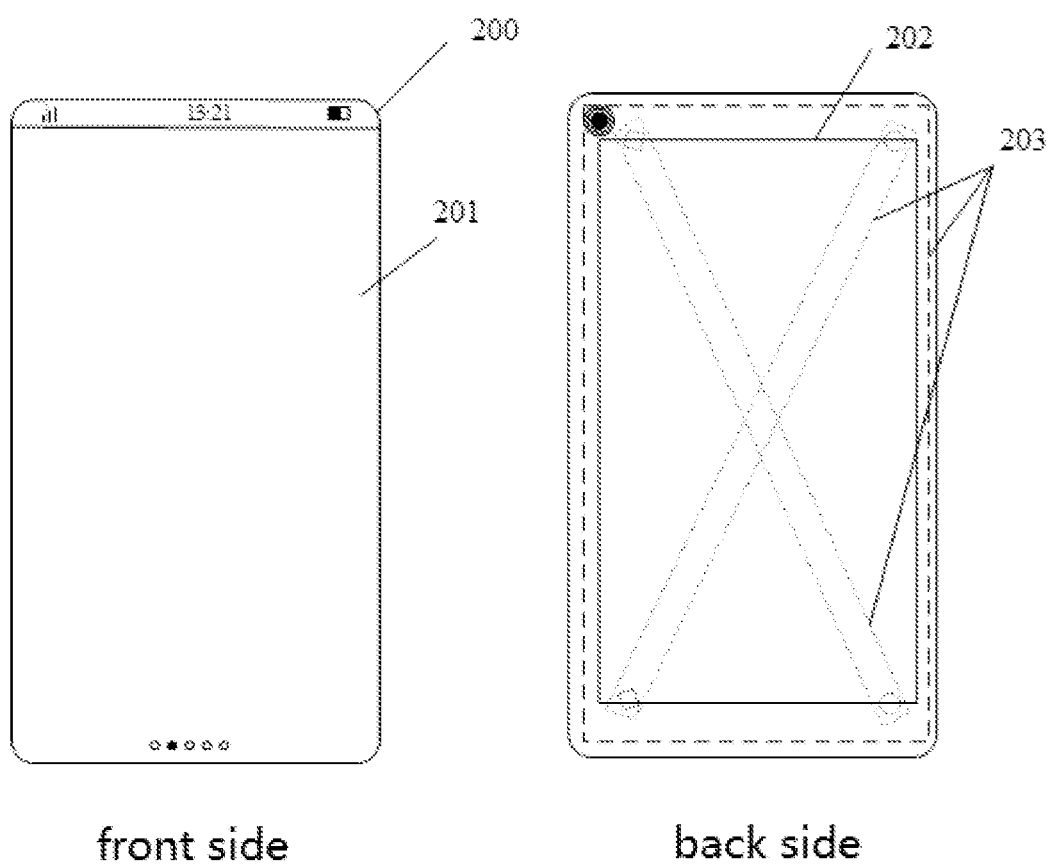
FIG. 2 is a schematic structural diagram of a terminal according to an embodiment of the present disclosure.

In order to solve the above-mentioned problem, the present disclosure provides a terminal with a flexible screen. Referring to FIG. 2 which is a schematic structural diagram of a terminal according to embodiments of the present disclosure. As shown in FIG. 2, the terminal 200 includes a first display screen 201, a second display screen 202 and a screen spreading and housing device 203.

The first display screen 201 and the second display screen 202 are respectively disposed on a front side and a back side of the terminal. The second display screen 202 is the flexible screen. The screen spreading and housing device 203 is configured to spread or house the second display screen 202 through a change of a structural form. For example, the screen spreading and housing device 203 has different structural forms respectively configured to house and spread the second display screen.

Optionally, the screen spreading and housing device 203 includes a storage component and a supporting component. The supporting component correspondingly has a contracted status and a supported status.

The second display screen 202 is spread from the storage component during a process in which the supporting component changes from the contracted status to the supported status.

The second display screen 202 is housed in the storage component when the supporting component changes from the supported status to the contracted status.

Optionally, the supporting component includes plurality of support bars, of which first ends are connected to the second display screen 202.

Moving directions of the first ends, connected to the second display screen 202, of the support bars are the same as a spreading or housing direction of the second display screen 202.

Optionally, the support bars are supported at a periphery of the second display screen 202 when the supporting component is in the supported status.

Optionally, the support bars form a specified angle with the spreading or housing direction of the second display screen 202 and are disposed inside the terminal when the supporting component is in the contracted status.

Optionally, the support bars are disposed on the outer side of the second display screen 202 when the supporting component is in the contracted status.

Alternatively, the support bars are disposed on the inner side of the second display screen 202 when the supporting component is in the contracted status.

Optionally, the screen spreading and housing device 203 further includes a servo component, to which second ends of the support bars are connected.

The servo component is configured to drive the second ends of the support bars during a process in which the supporting component changes from the contracted status to the supported status, such that the first ends of the support bars move in the spreading direction of the second display screen 202.

The servo component is configured to drive the second ends of the support bars during a process in which the supporting component changes from the supported status to the contracted status, such that the first ends of the support bars move in the housing direction of the second display screen 202.

Optionally, the terminal further includes a processor electrically connected to the servo component.

The processor is configured to send a control signal to the servo component when acquiring a control instruction. The control signal is configured to instruct the servo component to drive the second ends of the support bars.

Optionally, the control instruction is an instruction generated when a designated key is triggered. The designated key is a physical key or a virtual key configured to control the second display screen 202 to be housed or spread.

Alternatively, the control instruction is an instruction generated when a first application is started up.

Alternatively, the control instruction is an instruction generated when the terminal receives a designated operation that is executed in an application interface of a second application.

Optionally, the processor is electrically connected to the second display screen 202.

The processor is configured to control the second display screen 202 to be lit up during a process in which the supporting component changes from the contracted status to the supported status.

Optionally, the processor is configured to control the second display screen 202 to be off during a process in which the supporting component changes from the supported status to the contracted status.

In summary, the screen spreading and housing device and the second display screen cooperate with each other, such that the terminal can spread the second display screen from the screen spreading and housing device through the screen spreading and housing device. Alternatively, the terminal can house the second display screen into the screen spreading and housing device through the screen spreading and housing device. Thus, the terminal can be switched between the first display screen and the second display screen. Since the flexible screen and the screen spreading and housing device are combined, both of the screen spreading and housing device and the second display screen are housed inside the terminal when the second display screen is in a housed status, which guarantees the portability of the terminal. Moreover, instead of using the second display screen in all scenarios, the first display screen may be used or the second display screen may be spread for use as required. Thus, the power consumption of the display screen is reduced. Further, the battery durance of the terminal is improved.

Figure 3:
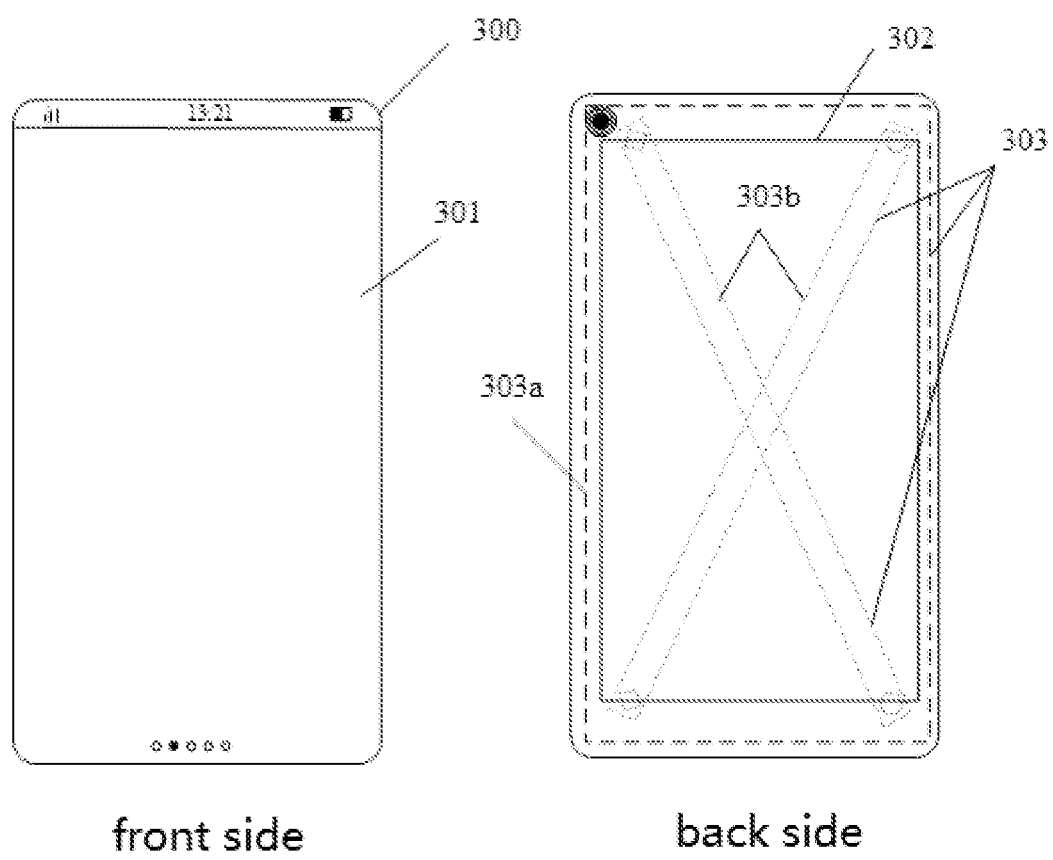
FIG. 3 is a schematic structural diagram of another terminal according to an embodiment of the present disclosure

In a possible implementation mode, the screen spreading and housing device may be connected to and powered by a power supply of the terminal and is disposed inside the terminal. The terminal spreads the second display screen through the screen spreading and housing device, such that the second display screen is displayed on the back side of the terminal. Referring to FIG. 3 which is a schematic structural diagram of another terminal according to embodiments of the present disclosure. As shown in FIG. 3, the terminal 300 includes a first display screen 301, a second display screen 302 and a screen spreading and housing device 303.

The first display screen 301 and the second display screen 302 are respectively disposed on a front side and a back side of the terminal. The second display screen 302 is a flexible screen. The screen spreading and housing device 303 is configured to spread or house the second display screen 302 through a change of a structural form.

As shown in FIG. 3, the first display screen 301 is disposed on the front side of the terminal 300, and the second display screen 302 is disposed on the back side of the terminal 300. The second display screen 302 is the flexible screen and can be housed inside the screen spreading and housing device 303 or spread from the screen spreading and housing device 303. Optionally, in practice, when the second display screen 302 is housed inside the screen spreading and housing device 303, it may be that part of the second display screen 302 is housed inside the screen spreading and housing device 303, and the other part is displayed on the back side of the terminal 300 as shown in FIG. 3. Since the second display screen needs to be housed inside the screen spreading and housing device 303, the second display screen 302 may be the flexible screen. In addition, a user may control the second display screen 302 to be spread from the screen spreading and housing device 303 or to be housed inside the screen spreading and housing device 303 from a spread state by controlling the terminal 300. It should be noted that the locations of the first display screen and the second display screen may be exchanged. That is, the first display screen is disposed on the back side of the terminal, and the second display screen is disposed on the front side of the terminal.

In a possible implementation mode, the second display screen 302 and the screen spreading and housing device 303 are completely disposed inside the terminal 300 when the second display screen 302 is housed inside the screen spreading and housing device 303. Thus, a length and a width of the terminal 300 may be controlled better. Further, the portability of the terminal 300 is improved.

In a possible implementation mode, when the second display screen 302 is disposed inside the screen spreading and housing device 303, namely, on the back side displayed in FIG. 3, the user can directly see the second display screen 302 from the back side of the terminal 300. The second display screen 302 may be operated when the second display screen 302 is lit up. Generally, the terminal can use the first display screen 301 for display and the second display screen 302 is off. The terminal can use the second display screen 302 for display when the user starts up the second display screen 302.

Optionally, the screen spreading and housing device 303 further includes a storage component 303a and a supporting component 303b. The supporting component 303b correspondingly has a contracted status and a supported status. The storage component 303a can be configured to house the second display screen 302. The second display screen 302 is spread from the storage component 303a during a process in which the supporting component 303b changes from the contracted status to the supported status. The second display screen 302 is housed inside the storage component when the supporting component 303b changes from the supported status to the contracted status. That is, the screen spreading and housing device 303 houses or spreads the second display screen 302 through a change of a structural form, and may house or spread the second display screen 302 through the form of the supporting component 303b. Optionally, the storage component 303a may be a storage cavity with a certain space, and the second display screen 302 of the terminal may be housed inside the storage cavity. That is, the second display screen 302, the storage component 303a and the supporting component 303b are connected to one another for cooperation, such that the second display screen 302 may be spread from the storage component or housed inside the storage component 303a.

Figure 4:
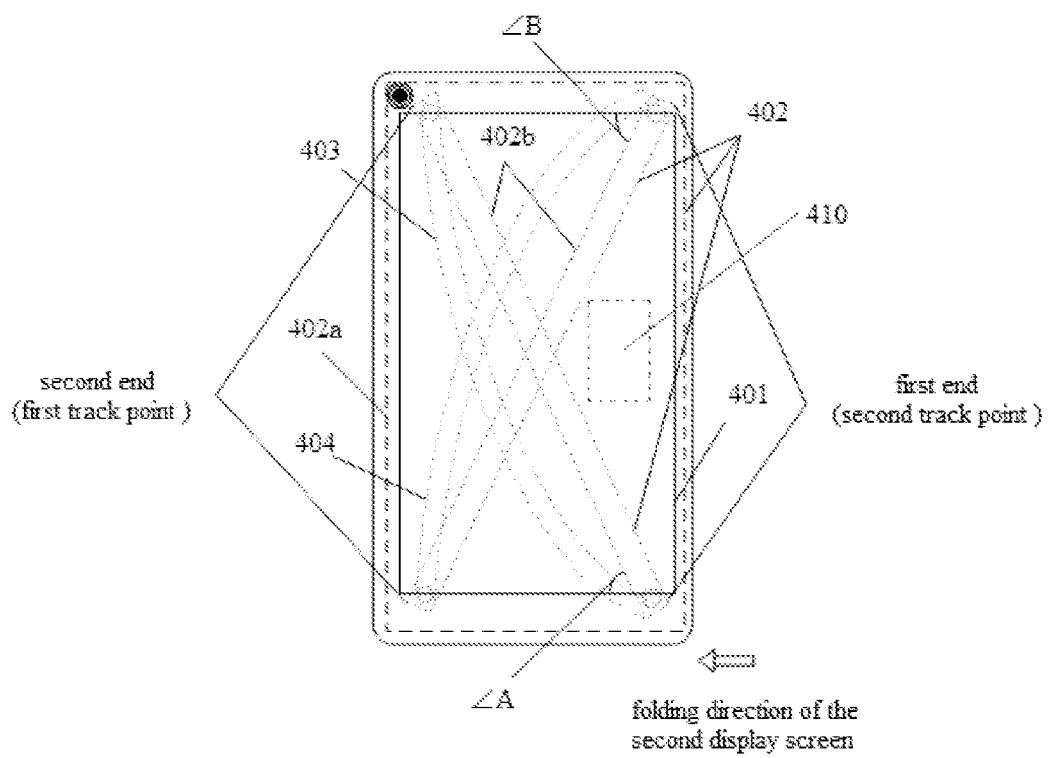
FIG. 4 is a schematic structural diagram of a screen spreading and housing device in a contracted status according to an embodiment of the present disclosure.
Figure 5:
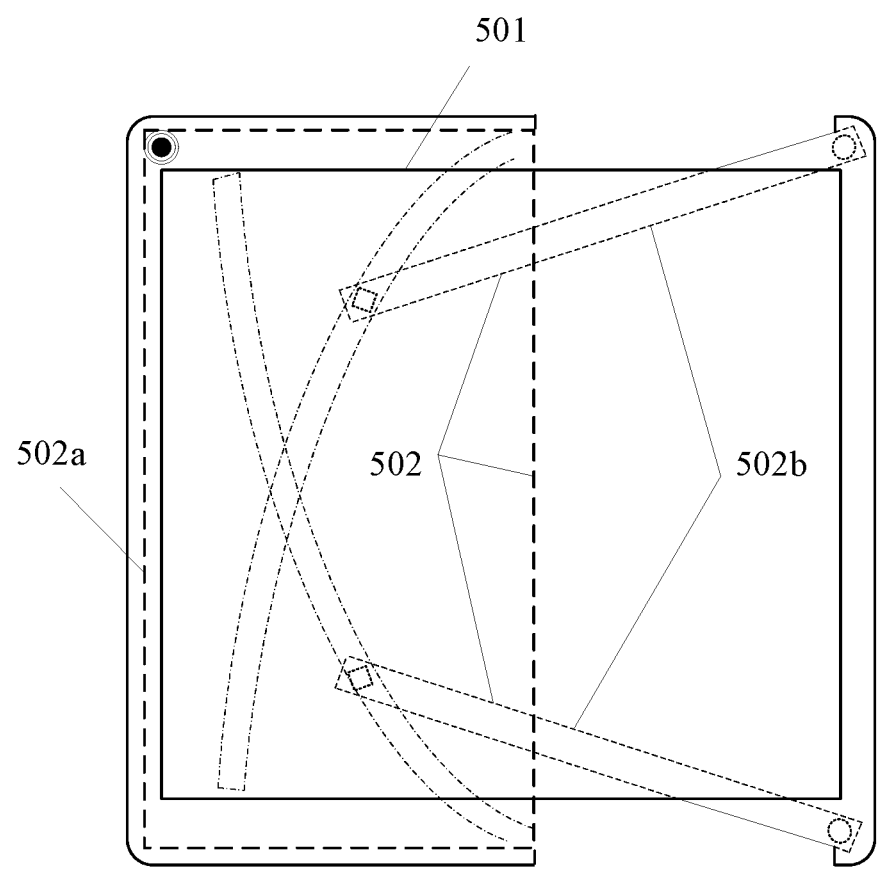
FIG. 5 is a schematic structural diagram of the screening spreading and housing device in a spreading or housing process according to an embodiment of the present disclosure.
Figure 6:
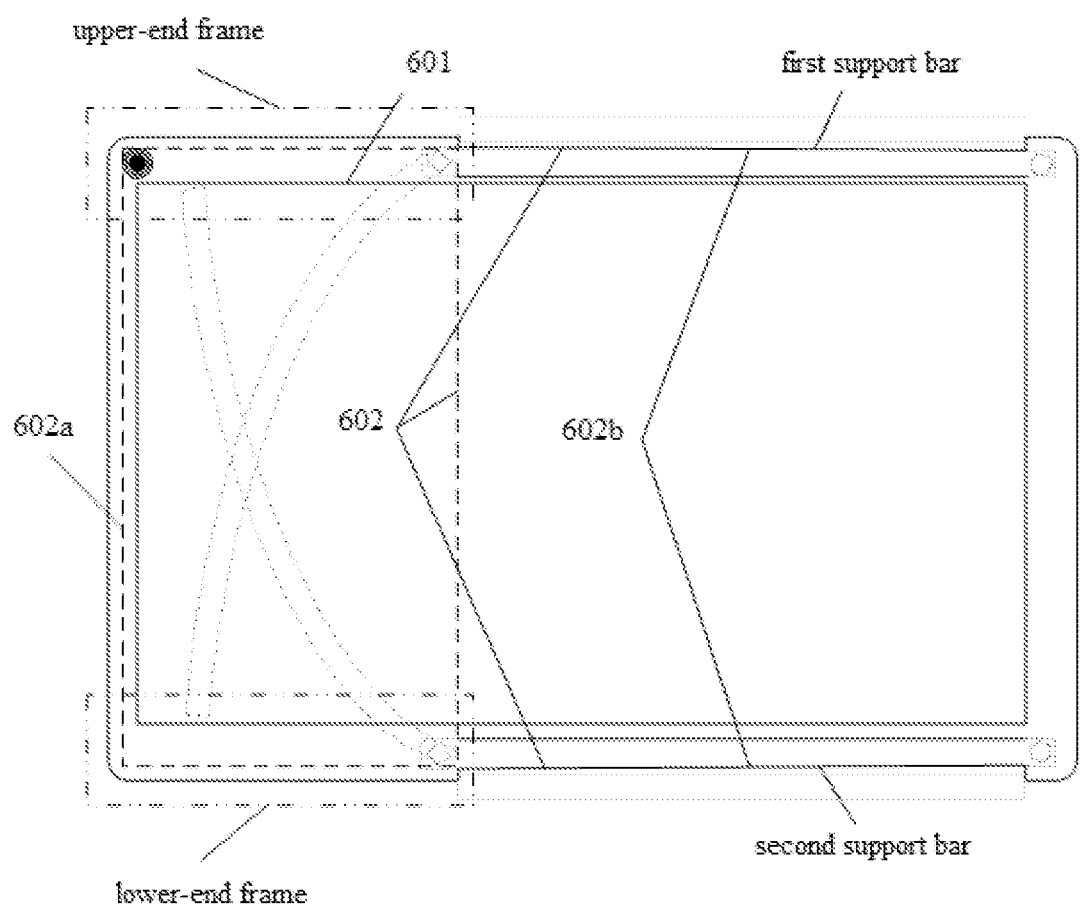
FIG. 6 is a schematic structural diagram of the screen spreading and housing device in a supported status according to an embodiment of the present disclosure.

Referring to FIG. 4 which is a schematic structural diagram of a screen spreading and housing device in a contracted status according to embodiments of the present disclosure. As shown in FIG. 4, a second display screen 401, the screen spreading and housing device 402, a storage component 402a and a supporting component 402b are included. The storage component 402a may be configured to house the second display screen. The supporting component 402b may be configured to spread the second display screen from the storage component or house the second display screen inside the storage component. Referring to FIG. 5 which is a schematic structural diagram of a housing or spreading process of a screen spreading and housing device according to embodiments of the present disclosure. As shown in FIG. 5, a second display screen 501, the screen spreading and housing device 502, a storage component 502a and a supporting component 502b are included. Referring to FIG. 6 which is a schematic structural diagram of a screen spreading and housing device in a supported status according to embodiments of the present disclosure. As shown in FIG. 6, a second display screen 601, the screen spreading and housing device 602, a storage component 602a and a supporting component 602b are included.

The second display screen is spread from the storage component when the supporting component changes from the status shown in FIG. 4 to the status shown in FIG. 6, namely, from the contracted status to the supported status. The second display screen is housed inside the storage component when the supporting component changes from the status shown in FIG. 6 to the status shown in FIG. 4, namely, from the supported status to the contracted status.

Optionally, the screen spreading and housing device shown in FIG. 4 or FIG. 6 includes the supporting component, which may include plurality of support bars. First ends of the plurality of support bars are connected to the second display screen. Moving directions of the first ends, connected to the second display screen, of the plurality of support bars are the same as a spreading or housing direction of the second display screen. It should be noted that the plurality of support bars provided by the present embodiment only take that one group of support bars (a first support bar and a second support bar) consist of two support bars as an example.

Figure 7:
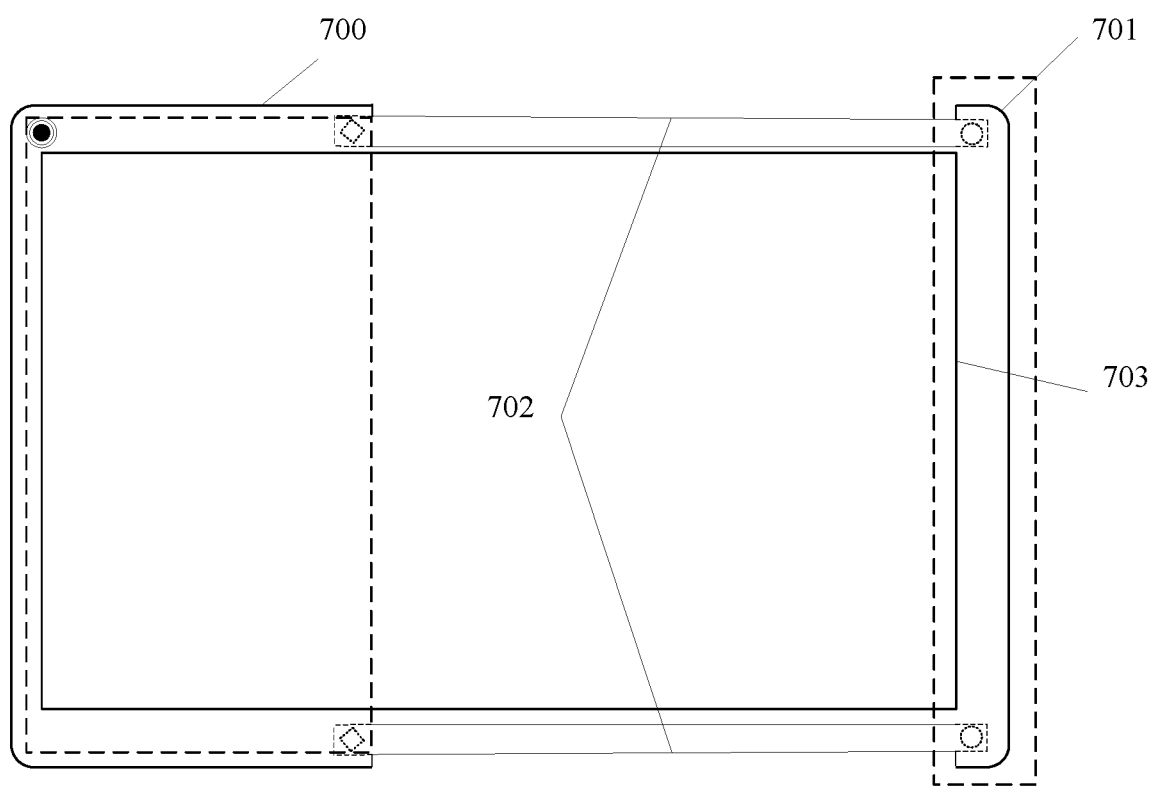
FIG. 7 is a schematic structural diagram showing a connection between a supporting component and a second display screen according to an embodiment of the present disclosure.

Further, the first ends of the plurality of support bars may be directly or indirectly connected to the second display screen. For example, referring to FIG. 7, which is a schematic structural diagram showing a connection between a supporting component and a second display screen. As shown in FIG. 7, a terminal 700 includes a first frame 701, at least on group of support bars 702 and a second display screen 703. The plurality of support bars 702 and the second display screen are connected to the first frame. The plurality of support bars 702 may indirectly enable the second display screen to be housed inside the storage component by driving the first frame 701 when changing from a supported status to a contracted status. Alternatively, the plurality of support bars 702 may indirectly enable the second display screen to be spread from the storage component by driving the first frame 701 when changing from the contracted status to the supported status. In the present embodiment, a specific connection mode between the first ends of the plurality of support bars and the second display screen is not limited when moving directions of the first ends of the plurality of support bars are the same as a spreading or housing direction of the second display screen.

Optionally, the at least one support bars are supported at a periphery of the second display screen when the supporting component is in the supported status. For example, as shown in FIG. 6, when the plurality of support bars shown in FIG. 6 are in the supported status, the first support bar is at an upper end of the second display screen and is in the same parallel position as an upper-end frame of the terminal, and the second support bar is at a lower end of the second display screen and is in the same parallel position as a lower-end frame of the terminal, such that the plurality of support bars can protect the second display screen when the second display screen is spread.

Optionally, the plurality of support bars form a specified angle with the spreading or housing direction of the second display screen and are disposed inside the terminal when the supporting component is in the contracted status. For example, as shown in FIG. 4, when the supporting component is in the contracted status, an angle A is an angle formed between the first support bar and the housing direction of the second display screen, and an angle B is an angle formed between the second support bar and the housing direction of the second display screen. Optionally, the angle may be correlated with materials, connection modes, locations, etc. of the selected support bars when a developer designs the terminal. The specific value of the angle will not be limited in the present embodiment. Optionally, for the aesthetic appearance and the applicability of the terminal, the at least one group support bars in the contracted status may be further designed inside the terminal.

Figure 8:
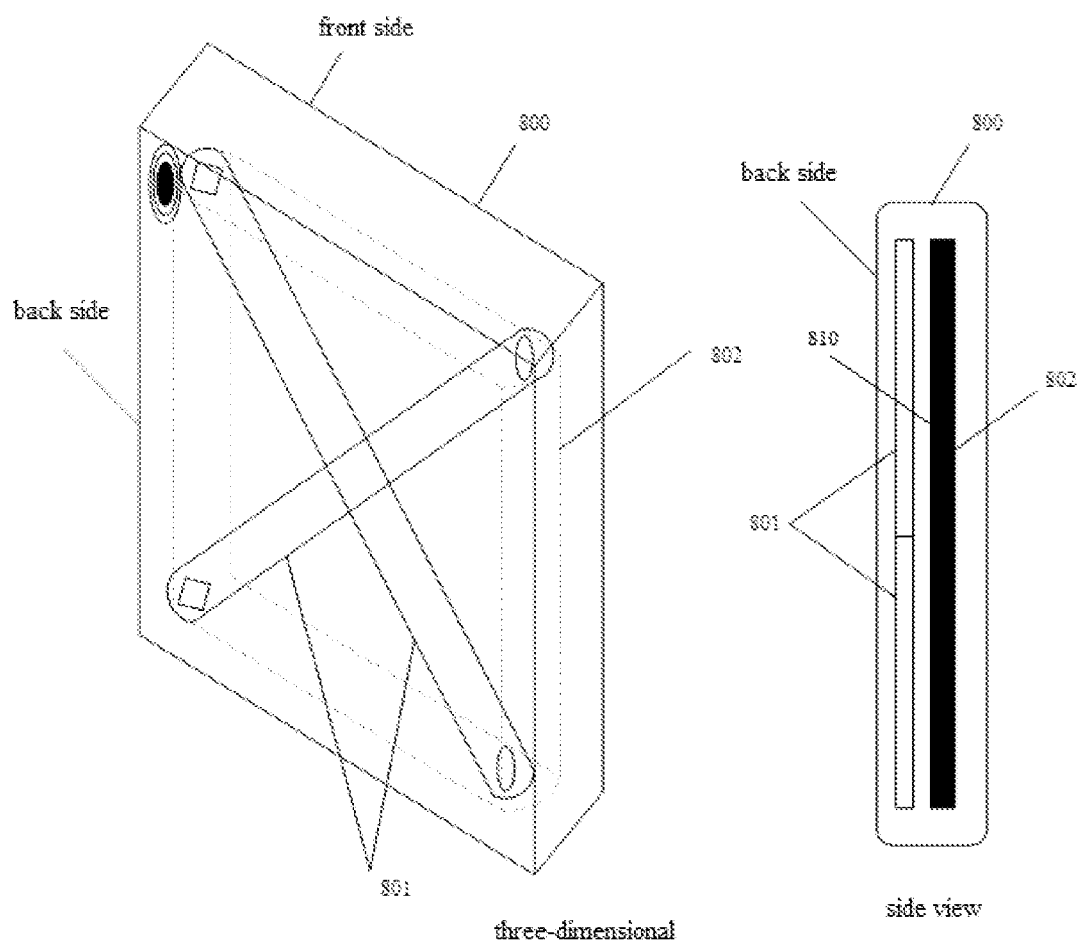
FIG. 8 is a schematic structural diagram of a side surface of the terminal shown in FIG. 4 according to an embodiment of the present disclosure.

In a possible implementation mode, the plurality of support bars 801 are disposed on the outer side 810 of the second display screen when the supporting component is in the contracted status. Referring to FIG. 8 which is a schematic structural diagram of a side surface of the terminal shown in FIG. 4. As shown in FIG. 8, the terminal 800 includes plurality of support bars 801 and a second display screen 802. The plurality of support bars 801 are disposed on the outer side 810 of the second display screen. Thus, the support bars can protect the second display screen to a certain degree when the second display screen of the terminal is in a housed status. Further, the durability of the second display screen is improved.

Figure 9:
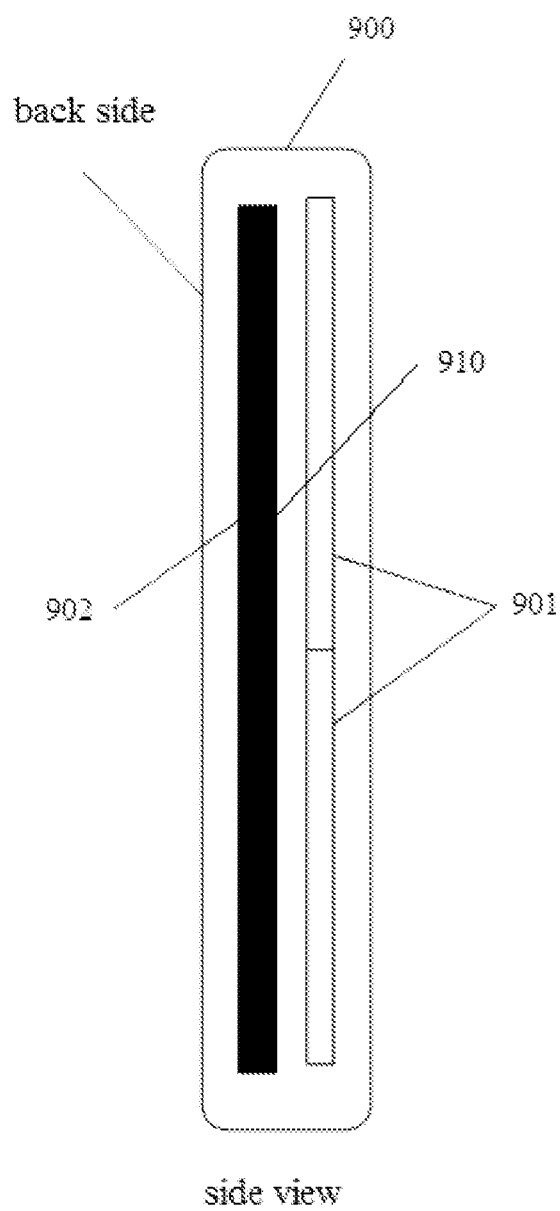
FIG. 9 is a schematic structural diagram of another side surface of the terminal shown in FIG. 4 according to an embodiment of the present disclosure.

In another implementation mode, the plurality of support bars are disposed on the inner side 910 of the second display screen when the supporting component is in the contracted status. Referring to FIG. 9 which is a schematic structural diagram of another side surface of the terminal shown in FIG. 4. As shown in FIG. 9, a terminal 900 includes plurality of support bars 901 and a second display screen 902. The plurality of support bars 901 are disposed on the inner side 910 of the second display screen. In this way, the support bars will not cover the second display screen when the second display screen of the terminal is in a housed status, such that the second display screen can display the content even in the housed status. Thus, the multi-faceted use performance of the terminal is improved.

For example, a display region of the second display screen 902 includes a housed visible region and a housed hidden region. The housed visible region can be directly observed by the user when the second display screen 902 is housed inside the screen spreading and housing device. The terminal may perform display through the first display screen or the housed visible region in the second display screen 902 when the user uses the terminal of which the second display screen 902 is in the housed status. The housed hidden region in the second display screen 902 may be off when the terminal performs display through the housed visible region in the second display screen 902.

Optionally, in the terminal shown in FIG. 4, the screen spreading and housing device 402 may further include a servo component 410 connected to second ends of the plurality of support bars. The servo component 410 may be configured to drive the second ends of the plurality of support bars during a process in which the supporting component changes from the contracted status to the supported status, such that the first ends of the plurality of support bars move in the spreading direction of the second display screen. Correspondingly, when the second display screen needs to be housed inside the screen spreading and housing device from an spread status, the servo component 410 may be further configured to drive the second ends of the plurality of support bars during a process in which the supporting component changes from the supported status to the contracted status, such that the first ends of the plurality of support bars move in the housing direction of the second display screen.

Optionally, the servo component 410 may be an electric motor, which electrically drives the second ends of the plurality of support bars to move simultaneously in their respective fixed tracks, such that the first ends of the plurality of support bars move in the spreading direction of the second display screen. As shown in FIG. 4, a first track 403 is a track in which the second end of the first support bar moves, and the second track 404 is a track in which the second end of the second support bar moves. Optionally, the electric motor drives the second ends of the plurality of support bars to move simultaneously in their respective tracks, such that the first ends of the plurality of support bars move in the spreading direction of the second display screen, and further, the second display screen is driven to be spread from the storage component 303a. That is, the second ends of the plurality of support bars are driven from a first track point to a second track point, such that the second display screen is spread. The first track point and the second ends of the plurality of support bars in the contracted status may coincide, and the second track point and the first ends of the plurality of supports in the contracted status may coincide.

Optionally, the servo component 410 may also be a magnetic driving component, which magnetically drives the second ends of the plurality of support bars to move simultaneously in their respective fixed tracks, such that the first ends of the plurality of support bars move in the spreading direction of the second display screen. That is, similarly, the second ends of the plurality of support bars are driven from the first track point to the second track point, such that the second display screen is spread. It should be noted that the present embodiment will not limit the specific kind of power adopted by the servo component to enable the second ends of the plurality of support bars to move in their respective fixed tracks such that the second display screen is spread from the screen spreading and housing device by the first ends of the plurality of support bars.

Similarly, the terminal drives the second ends of the plurality of support bars to move simultaneously in their respective fixed tracks through the servo component, such that the first ends of the plurality of support bars move in the housing direction of the second display screen, which may be opposite to the spreading direction of the second display screen. That is, the second ends of the plurality of support bars are driven from the second track point to the first track point, such that the second display screen changes from the spread status to the housed status. Optionally, the first track and the second track may be arc-shaped, linear, etc.

Optionally, the servo component may be controlled by a processor in the terminal. That is, the terminal shown in FIG. 4 may further include the processor electrically connected to the servo component. Correspondingly, the processor may be configured to send a control signal to the servo component when acquiring a control instruction in the terminal. The control signal is configured to instruct the servo component to drive the second ends of the plurality of support bars. The control instruction may be configured to indicate that the second display screen needs to be spread from or housed inside the screen spreading and housing device.

Figure 10:
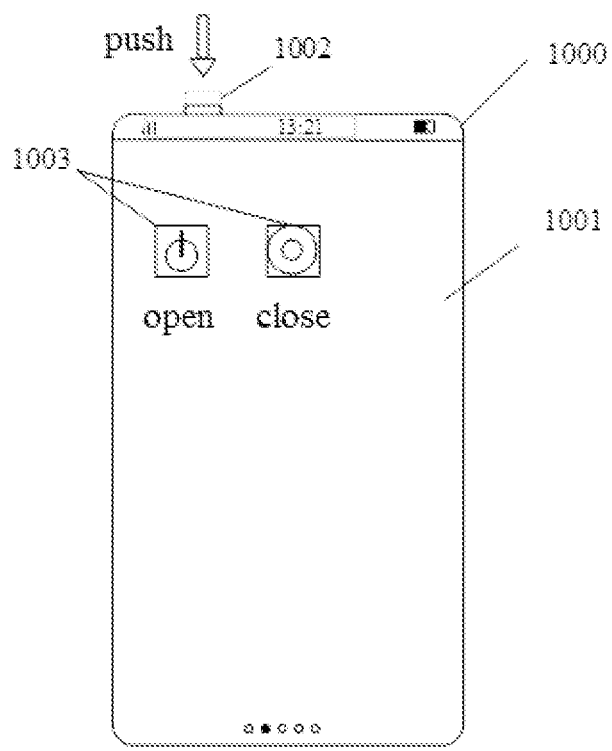
FIG. 10 is a diagram showing a display interface on a front side of the terminal according to an embodiment of the present disclosure.

In a possible implementation mode, the control instruction is an instruction generated when a designated key is triggered. The designated key is a physical key or a virtual key configured to control the second display screen to be housed or spread. For example, referring to FIG. 10 which is a diagram showing a display interface on a front side of a terminal according to embodiments of the present disclosure. As shown in FIG. 10, the terminal 1000 includes a first display screen 1001 and a first key 1002. Assuming that depressing of the first key 1002 corresponds to spreading of the second display screen, and restoration to the initial position corresponds to housing of the second display screen, the user can send an instruction of spreading the second display screen to the processor of the terminal by depressing the first key 1002. The processor of the terminal may further generate, according to the instruction of spreading the second display screen, a signal corresponding to the signal generated when the first key is triggered, (namely, the signal is control signal sent by the processor to the servo component), the processor of the terminal sends the generated signal that corresponds to the signal generated when the first key is triggered to the servo component, such that the servo component acquires the control signal and further drives the plurality of support bars in the screen spreading and housing device to perform a track motion similar to the track motion shown in FIG. 4. Thus, the second display screen is spread.

Figure 11:
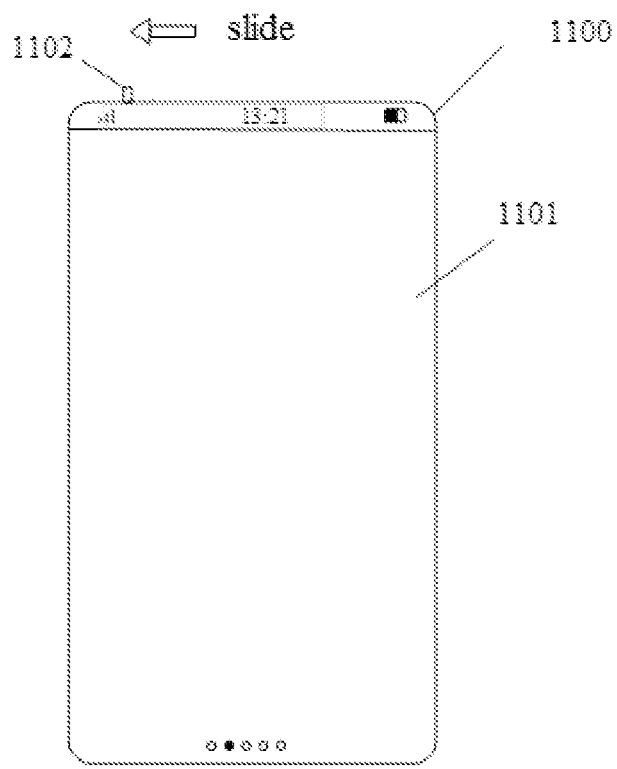
FIG. 11 is a diagram showing another display interface on the front side of the terminal according to an embodiment of the present disclosure.

Optionally, the first key 1002 shown in FIG. 10 may be in the form of left-and-right slider, such that the second display screen is triggered to be spread or housed. Referring to FIG. 11 which is a diagram showing another display interface on a front side of a terminal according to embodiments of the present disclosure. For example, as shown in FIG. 11, the terminal 1100 includes a first display screen 1101 and a first key 1102. Assuming that leftward sliding of the first key 1102 corresponds to spreading of the second display screen and rightward sliding corresponds to housing of the second display screen. The terminal can generate a control signal similarly in response to the depressing of the first key when the user slides the first key leftwards, such that the control signal is sent to the servo component. Thus, the servo component acquires the control signal and further drives the plurality of support bars in the screen spreading and housing device to control the second display screen to be spread.

Optionally, a virtual key 1003 may be further displayed in the first display screen 1001 shown in FIG. 10. When the user clicks an ON key in the virtual key 1003, the terminal may be triggered in response to the ON key to generate an instruction that controls the second display screen to be spread. When the user clicks an OFF key in the virtual key 1003, the terminal may be triggered in response to the OFF key to generate an instruction that controls the second display screen to be housed. Further, the processor of the terminal may send the control signal, which controls the servo component to drive the second ends of the plurality of support bars, to the servo component based on the received control instruction, such that the second ends of the plurality of support bars are controlled to drive the second display screen to be spread or housed.

In a possible implementation mode, an attitude sensor, which can determine whether the first display screen is spread or not based on an attitude of the terminal, may be disposed in the terminal. For example, when the first display screen of the terminal faces away from the center of gravity, the terminal determines that the first display screen needs to be spread. When the fact that the first display screen faces away from the center of gravity is detected by the attitude sensor of the terminal, the terminal can generate a control signal similarly in response to the depressing of the first key. Thus, the control signal is sent to the servo component. The servo component acquires the control signal and further drives the plurality of support bars in the screen spreading and housing device to control the second display screen to be spread.

Figure 12:
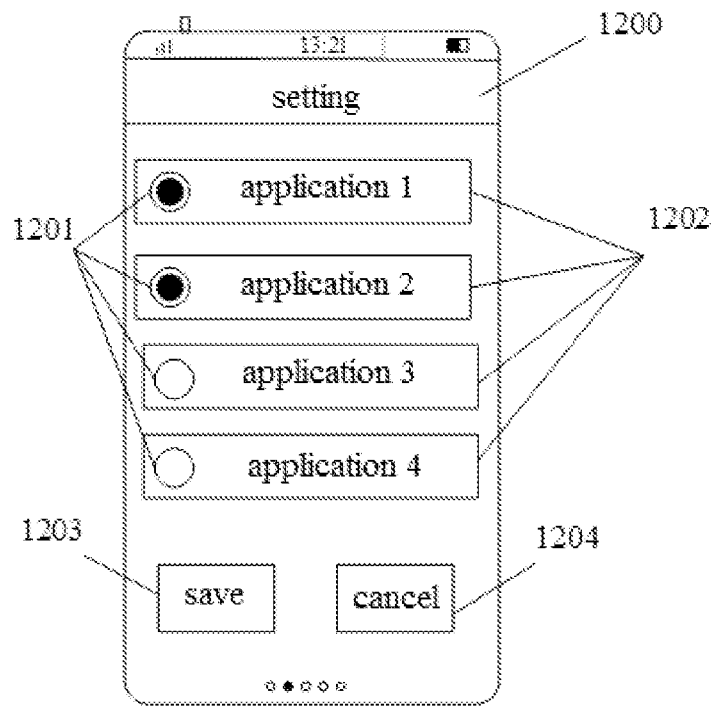
FIG. 12 is a schematic diagram of a setting interface for start of a second display screen according to an embodiment of the present disclosure.

In a possible implementation mode, the control instruction may also be an instruction generated when a first application is started up. For example, an application is mounted in the terminal, and the user can enable the attributes of the second display screen by setting a corresponding application in a setting interface. Referring to FIG. 12 which is a schematic diagram of a setting interface for enabling the second display screen according to embodiments of the present disclosure. As shown in FIG. 12, the setting interface 1200 includes a select control 1201, an application column 1202, a save control 1203 and a cancel control 1204. For the corresponding application column 1202, the user can click the select control 1201 and the save control 1203 to set an application that corresponds to the select control as the first application. When the user clicks the first application in the first display screen, the processor of the terminal can acquire an instruction (namely, the control instruction) generated when the first application is started up, such that a control signal is sent to the servo component, and the plurality of support bars of the screen spreading and housing device are controlled to drive the second display screen to be spread.

For example, when the first application selected by the user is an application XX in the terminal, the processor of the terminal can be triggered to acquire the control instruction when the user starts up the application XX later, such that the second display screen is spread. Optionally, the setting of the first application may also be that a developer sets some default applications in the terminal as the first application in advance. For example, a video application, a gate application, etc. in the terminal are set in advance. The terminal can start up the second display screen when the user starts the video application or the game application in the terminal, such that the second display screen is adopted to display interfaces of the corresponding applications.

Further, the control instruction may also be an instruction generated when the terminal receives a designated operation executed in an application interface of a second application. For example, the second application is a certain live-broadcast application. The designated operation is an operation performed by the user on a full-screen display control in the certain live-broadcast application. The user who wants to perform full-screen display on a live video can click the full-screen display control. At this time, the terminal can generate an instruction (namely, the control instruction) in response to a clicking operation performed by the user on the full-screen display control. The processor can send a control signal to the servo component to trigger the second display screen to be spread when acquiring the control instruction. Correspondingly, the processor of the terminal sends a control instruction that controls the second display screen to be housed to the servo component. For details that will not be repeated herein, referring to the above description that the processor of the terminal sends the control signal that controls the second display screen to be spread.

Optionally, when the terminal enables the first display screen or the second display screen for display, the other display screen may be off. That is, optionally, the processor in the terminal may be further electrically connected to the second display screen and the first display screen. The second display screen is controlled to be lit up during a process in which the processor controls the supporting component to change from the contracted status to the supported status. At this time, in the terminal, the first display screen may be off when the second display screen is lit up.

Optionally, the plurality of support bars of the supporting component may also be electrically connected to the processor of the terminal. A signal for lighting up the second display screen is sent to the processor at the start that the plurality of support bars of the supporting component change from the contracted status to the supported status, such that the processor lights up the second display screen. Optionally, that the signal for lighting up the second display screen is sent to the processor at the start that the plurality of support bars of the supporting component change from the contracted status to the supported status may be replaced with that the signal for lighting up the second display screen is sent to the processor during a process in which the plurality of support bars of the supporting component change from the contracted status to the supported status, or it may be replaced with that the signal for lighting up the second display screen is sent to the processor at the end that the plurality of support bars of the supporting component change from the contracted status to the supported status.

That is, the processor may control the second display screen to be lit up by the following means: the second display screen is directly lit up and the first display screen is directly turned off simultaneously at the start that the supporting component changes from the contracted status to the supported status; or the second display screen is gradually lit up along with spreading of the second display screen during a process in which the supporting component changes from the contracted status to the supported status, and correspondingly, the first display screen is gradually turned off during a process in which the supporting component changes from the contracted status to the supported status; or the second display screen is directly lit up and the first display screen is directly turned off simultaneously at the end that the supporting component changes from the contracted status to the supported status (that is, when the supporting component completely changes to the supported status).

Correspondingly, the second display screen is controlled to be off during a process in which the processor controls the supporting component to change from the supported status to the contracted status through the servo component. Optionally, referring to the method in which the processor controls the second display screen to be lit up for the method in which the processor controls the second display screen to be off, which will not be repeated herein.

Figure 13:
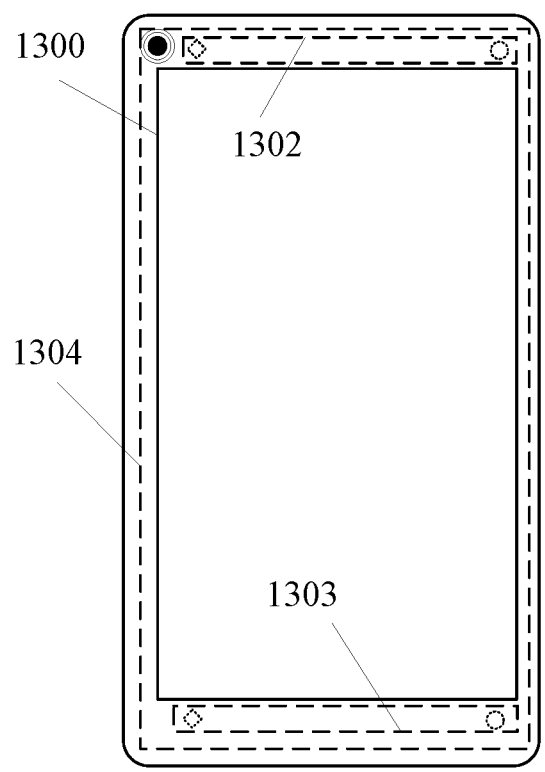
FIG. 13 to FIG. 15 are schematic diagrams showing an spreading process of a second display screen of a terminal according to an embodiment of the present disclosure.
Figure 14:
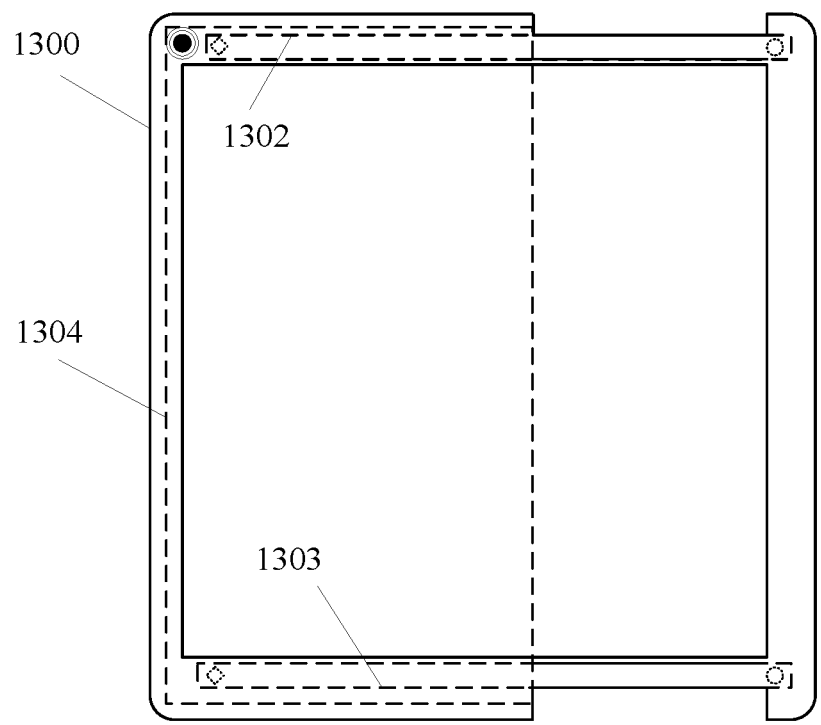
Figure 15:
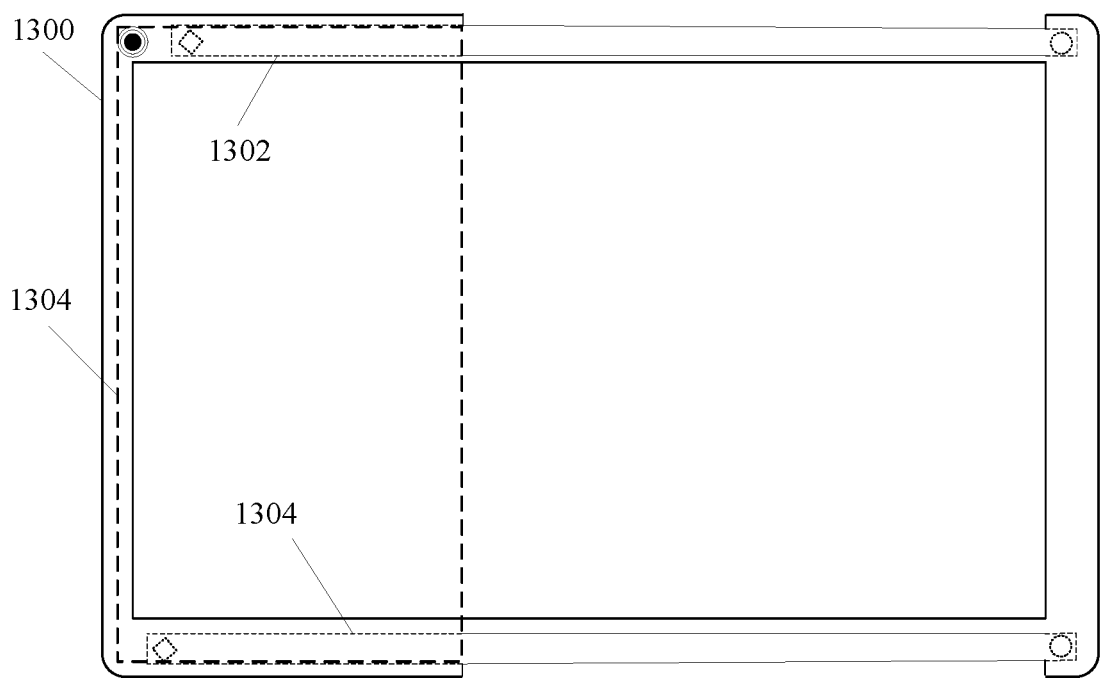

In a possible implementation mode, the plurality of support bars may also adopt a telescopic design. Referring to FIGS. 13 to 15, which are schematic diagrams showing an spreading process of a second display screen of a terminal according to embodiments of the present disclosure. As shown in FIGS. 13 to 15, a terminal 1300 includes a second display screen 1301, a first support bar 1302, a second support bar 1303 and a storage component 1304. The first support bar 1302 may be disposed inside an upper-end frame of the terminal, the second support bar 1303 may be disposed inside a lower-end frame of the terminal, and the two support bars are mutually parallel, are both telescopic bars and expand and contract to enable the second display screen 1301 to be spread or housed. That is, when the first support bar 1302 and the second support bar 1303 change from the contracted status to the supported status, the second display screen 1301 can be pushed to stretch out of the storage component 1304 to accomplish spreading of the second display screen. Similarly, a housing process of the second display screen is an inverse process of the above-mentioned spreading process, and therefore, will not be repeated herein. It should be noted that here is only to explain different formats and telescopic means of the support bars, other devices (for example, the servo component) included by the screen spreading and housing device are also applicable to the terminal shown in FIGS. 13 to 15, and their working principles will not be repeated herein.

In summary, the screen spreading and housing device and the second display screen cooperate with each other, such that the terminal can spread the second display screen from the screen spreading and housing device through the screen spreading and housing device. Alternatively, the terminal can house the second display screen inside the screen spreading and housing device through the screen spreading and housing device, such that the terminal can be switched between the first display screen and the second display screen. Since the flexible screen and the screen spreading and housing device are combined, both of the screen spreading and housing device and the second display screen are housed inside the terminal when the second display screen is in the contracted status, which guarantees the portability of the terminal. Moreover, instead of using the second display screen in all scenarios, the first display screen may be used or the second display screen may be spread for use as required. Thus, the power consumption of the display screens is reduced. Further, the battery durance of the terminal is improved.

The technical solutions provided by the embodiments of the present disclosure at least have the following beneficial effects:

The terminal provided by the present disclosure includes the first display screen, the second display screen and the screen spreading and housing device. The first display screen and the screen spreading and housing device are respectively disposed on the front side and the back side of the terminal. The second display screen is the flexible screen. The screen spreading and housing device is configured to spread or house the second display screen through the change of the structural form. Since the flexible screen and the screen spreading and housing device are combined, both of the screen spreading and housing device and the second display screen are housed in the terminal when the second display screen is in a housed status, which guarantees the portability of the terminal. Moreover, instead of using the second display screen in all scenarios, the first display screen may be used or the second display screen may be spread for use as required. Thus, the power consumption of the display screens is reduced. Further, the battery durance of the terminal is improved.

In some embodiments, wherein the screen spreading and housing device comprises a storage component and a supporting component; the supporting component correspondingly has a contracted status and a supported status;

the second display screen is spread from the storage component during a process in which the supporting component changes from the contracted status to the supported status; and the second display screen is housed in the storage component during a process in which the supporting component changes from the supported status to the contracted status.

In some embodiments, the supporting component comprises a plurality of support bars, of which first ends are connected to the second display screen; and moving directions of the first ends, connected to the second display screen, of the plurality of support bars are the same as a spreading or housing direction of the second display screen.

In some embodiments, the plurality of support bars are supported at a periphery of the second display screen when the supporting component is in the supported status.

In some embodiments, the plurality of support bars form a specified angle with the spreading or housing direction of the second display screen and are disposed inside the terminal when the supporting component is in the contracted status.

In some embodiments, the plurality of support bars are disposed on the outer side of the second display screen when the supporting component is in the contracted status. Alternatively, the plurality of support bars are disposed on the inner side of the second display screen when the supporting component is in the contracted status.

In some embodiments, the screen spreading and housing device further comprises a servo component, to which second ends of the plurality of support bars are connected;

the servo component is configured to drive the second ends of the plurality of support bars during a process in which the supporting component changes from the contracted status to the supported status, such that the first ends of the plurality of support bars move in the spreading direction of the second display screen; and the servo component is further configured to drive the second ends of the plurality of support bars during a process in which the supporting component changes from the supported status to the contracted status, such that the first ends of the plurality of support bars move in the housing direction of the second display screen.

In some embodiments, further comprising a processor electrically connected to the servo component, wherein the processor is configured to send a control signal to the servo component when acquiring a control instruction, and the control signal is configured to instruct the servo component to drive the second ends of the plurality of support bar.

In some embodiments, the control instruction is an instruction generated when a designated key is triggered, and the designated key is a physical key or a virtual key configured to control the second display screen to be housed or spread. Alternatively, the control instruction is an instruction generated when a first application is started up; or the control instruction is an instruction generated when the terminal receives a designated operation that is executed in an application interface of a second application.

In some embodiments, wherein the processor is further electrically connected to the second display screen; and the processor is configured to control the second display screen to be lit up during a process in which the supporting component changes from the contracted status to the supported status.

In some embodiments, wherein the processor is configured to control the second display screen to be off during a process in which the supporting component changes from the supported status to the contracted status.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A terminal, comprising:
a first display screen disposed on a front side of the terminal;
a second display screen disposed on a back side of the terminal; and
a screen spreading and housing device,
wherein the second display screen is a flexible screen; and
wherein the screen spreading and housing device comprises different structural forms respectively configured to house and spread the second display screen;
wherein the screen spreading and housing device further comprises a supporting component, a storage component and a servo component; wherein the supporting component has a contracted status and a supported status, and comprises a plurality of support bars, of which first ends are connected to the second display screen and second ends are connected to the servo component, wherein moving directions of the first ends, connected to the second display screen, of the plurality of support bars are the same as a spreading or housing direction of the second display screen; and the servo component is disposed on an inside boundary of the first display screen when the supporting component is in the contracted status;
wherein the second display screen is spread from the storage component during a process in which the supporting component changes from the contracted status to the supported status; and the second display screen is housed in the storage component during a process in which the supporting component changes from the supported status to the contracted status;

wherein the plurality of support bars form a specified angle with the spreading or housing direction of the second display screen, are disposed inside the terminal, and are disposed on an outer side of the second display screen when the supporting component is in the contracted status; the plurality of support bars are supported at a periphery of the second display screen when the supporting component is in the supported status;

wherein the plurality of support bars comprises a first support bar and a second support bar, a track along which the second end of the first support bar moves and a track along which the second end of the second support bar moves are both arc-shaped; and wherein the servo component is configured to drive the second ends of the plurality of support bars during the process in which the supporting component changes from the contracted status to the supported status, such that the first ends of the plurality of support bars move in the spreading direction of the second display screen; and the servo component is further configured to drive the second ends of the plurality of support bars during the process in which the supporting component changes from the supported status to the contracted status, such that the first ends of the plurality of support bars move in the housing direction of the second display screen.

2. The terminal according to claim 1, further comprising a processor electrically connected to the servo component, wherein the processor is configured to send a control signal to the servo component when acquiring a control instruction, and the control signal is configured to instruct the servo component to drive the second ends of the plurality of support bar.

3. The terminal according to claim 2, wherein the control instruction comprises an instruction generated when a designated key is triggered, and the designated key is a physical key or a virtual key configured to control the second display screen to be housed or spread.

4. The terminal according to claim 2, wherein the control instruction comprises an instruction generated when a first application is started up.

5. The terminal according to claim 2, wherein the control instruction comprises an instruction generated when the terminal receives a designated operation that is executed in an application interface of a second application.

6. The terminal according to claim 2, wherein the processor is configured to control the second display screen to be off during a process in which the supporting component changes from the supported status to the contracted status.

7. The terminal according to claim 2, wherein the processor is further electrically connected to the second display screen; and the processor is configured to control the second display screen to be lit up during a process in which the supporting component changes from the contracted status to the supported status.

8. The terminal according to claim 7, wherein the second display screen is totally lit up and the first display screen is totally turned off at the start of a process in which the supporting component changes from the contracted status to the supported status.

9. The terminal according to claim 7, wherein the second display screen is gradually lit up along with spreading of the second display screen during a process in which the supporting component changes from the contracted status to the supported status, and the first display screen is gradually turned off during a process in which the supporting component changes from the contracted status to the supported status.

10. The terminal according to claim 7, wherein the second display screen is totally lit up and the first display screen is totally turned off at the end of a process in which the supporting component changes from the contracted status to the supported status.

11. The terminal according to claim 1, wherein the second ends of the plurality of support bars are movable across the second display screen.

12. The terminal according to claim 1, wherein the second ends of the plurality of support bars move simultaneously in their respective fixed arc tracks, such that the first ends of the plurality of support bars move in the spreading direction of the second display screen.

13. The terminal according to claim 1, wherein when the supporting component is in the supported status, the first support bar is at an upper end of the second display screen and is in a position aligned with an upper-end frame of the terminal, and the second support bar is at a lower end of the second display screen and is in a position as aligned with a lower-end frame of the terminal.

14. The terminal according to claim 1, wherein a display region of the second display screen comprises a visible region and a hidden region after the second display screen being housed, wherein the hidden region is configured to be in an off state and the visible region is configured to be in an on state when the second display screen is being housed.

15. The terminal according to claim 1, wherein the servo component is a magnetic driving component.

16. The terminal according to claim 1, further comprising an orientation sensor, wherein the orientation sensor is configured to determine, based on an orientation of the terminal, whether the first display screen is to be spread.

17. The terminal according to claim 16, wherein in response to determining that the first display screen faces away from a gravity direction, the orientation sensor determines that the first display screen is to be spread.

18. The terminal according to claim 1, wherein when one of the first display screen and the second display screen is displayed, the other one is off.

* * * * *